US006526820B1

(12) United States Patent
Schmid et al.

(10) Patent No.: US 6,526,820 B1
(45) Date of Patent: Mar. 4, 2003

(54) RAIN SENSOR WITH BONDED CHIPS

(75) Inventors: Bernd Schmid, Lauffen (DE); Thomas Schuler, Wiernsheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 09/454,153

(22) Filed: Dec. 3, 1999

(30) Foreign Application Priority Data

Jun. 14, 1997 (DE) ......................................... 197 25 287

(51) Int. Cl.⁷ .............................................. G01W 1/00
(52) U.S. Cl. ..................... 73/170.17; 250/577; 340/602
(58) Field of Search ............................. 73/170.17, 293;
340/602, 604; 250/577, 574, 227.25, 514;
318/483

(56) References Cited

U.S. PATENT DOCUMENTS

| | | | | |
|---|---|---|---|---|
| 4,584,508 A | * | 4/1986 | Kabayashi et al. | 318/483 |
| 4,701,613 A | * | 10/1987 | Watanabe et al. | 250/227 |
| 5,391,891 A | * | 2/1995 | Wiegleb et al. | 250/574 |
| 5,560,245 A | * | 10/1996 | Zettler et al. | 73/335.01 |
| 5,680,489 A | * | 10/1997 | Kersey | 356/35.5 |
| 5,703,568 A | * | 12/1997 | Hegyi | 340/602 |
| 5,981,979 A | * | 11/1999 | Brunner | 257/99 |
| 6,147,753 A | * | 11/2000 | Koyama et al. | 356/237.3 |

FOREIGN PATENT DOCUMENTS

| | | |
|---|---|---|
| DE | 38 23 300 | 8/1989 |
| DE | 38 06 881 | 9/1989 |
| DE | 40 06 174 | 2/1990 |
| DE | 40 06 420 | 5/1991 |
| DE | 43 43 474 | 7/1994 |
| DE | 43 30 710 | 11/1994 |
| DE | 44 03 221 | 1/1995 |
| DE | 43 29 609 | 2/1995 |
| DE | 43 33 665 | 4/1995 |
| DE | 43 37 835 | 5/1995 |
| DE | 43 40 681 | 6/1995 |
| DE | 195 26 249 | 2/1996 |
| DE | 35 28 009 | 2/1997 |
| EP | 0988190 | * 6/1997 |
| FR | 2 722 291 | 1/1996 |
| FR | 2 723 448 | 2/1996 |

OTHER PUBLICATIONS

Patent Abstract of Japan, Publication No. 59159035 dated Aug. 09, 1984, in the name of Nippon Denso Co., Ltd. "Liquid Detection for Automatic Windshield Wiper Control Apparatus".

Bartels, Jurgen; "Scheibenwisher wird durch Feuchtigkeit Gesteuert".

\* cited by examiner

*Primary Examiner*—Max Noori
(74) *Attorney, Agent, or Firm*—J. Gordon Lewis

(57) ABSTRACT

The invention is a rain sensor including a transmitter and receiver formed by chips bonded onto a printed circuit board. Advantageous embodiments of the invention provide filtering of radiation guided to the receiver of the sensor. The sensor is provided with a barrier to suppress parasitic radiation.

20 Claims, 2 Drawing Sheets

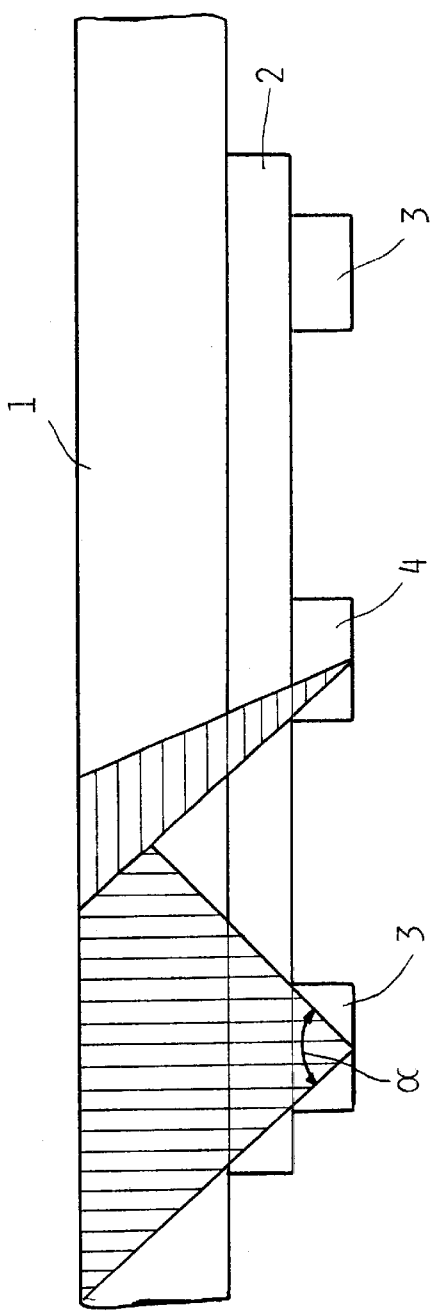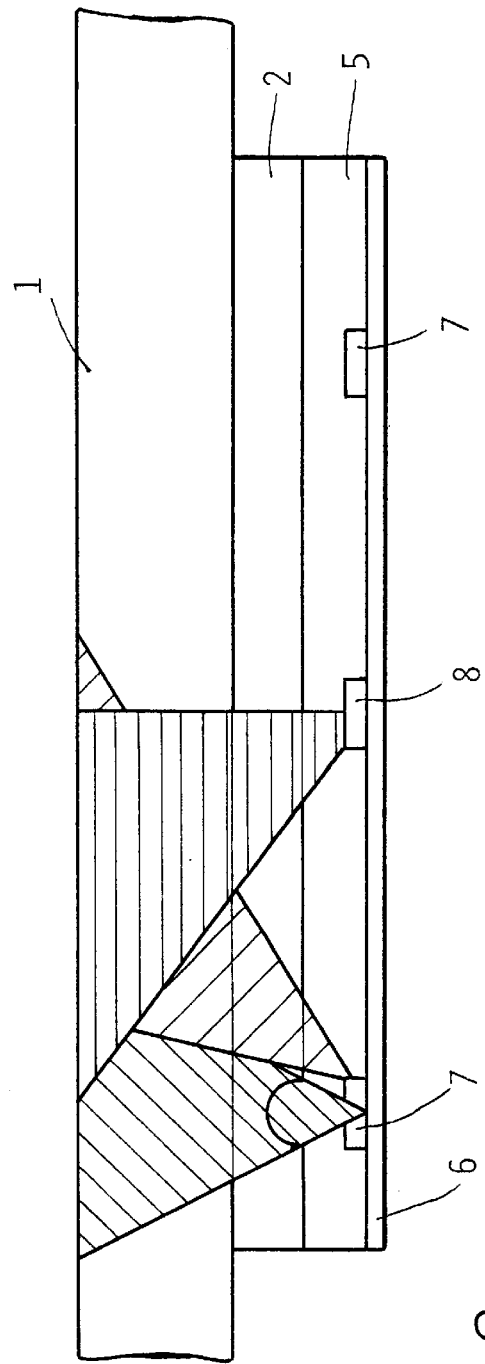
FIG. 1
FIG. 2

RAIN SENSOR WITH BONDED CHIPS

BACKGROUND OF THE INVENTION

The invention pertains to a rain sensor that serves for controlling the windshield wiper system of a motor vehicle dependent on the wetting of the windshield.

FR-OS 2 722 291 describes a method in which light from a luminous diode is emitted onto the first lateral surface of a windshield, with said light being reflected on the boundary surface of the second windshield surface. The intensity of the measured reflected radiation represents a measure of the wetting of the windshield. However, this sensor has significant spatial dimensions. This is particularly disadvantageous when several luminous diodes are utilized. Optical lenses that diffract the radiation emitted on the end face are required. This reduces the degree of effectiveness of the sensor with the sensitivity of the sensor also deteriorating.

SUMMARY OF THE INVENTION

The invention aims to design the sensor in such a way that a larger number of radiation transmitters can be advantageously utilized, wherein the sensor should be inexpensive to manufacture and only have small dimensions.

The invention, in principle, proposes to eliminate the use of encapsulated luminous diodes that are available on the market, have a relatively large space requirement, and are also quite expensive. Conventional luminous diodes of this type contain chips that are bonded onto power supply lines, are provided with a reflector, and subsequently are placed into a housing. The core of the invention consists of directly bonding the chips onto a printed circuit board in the desired arrangement. This results in various advantages, e.g., the reflectors and the diode housing can be eliminated.

In order to maintain the sensitivity of the sensor particularly high, the luminous flux emitted at a certain angle should also be particularly high. Consequently, an LED chip that emits a high luminous flux from its lateral surfaces (edge emission) is selected.

Instead of concentrating the radiation of an LED chip emitted on the end face by means of a lens, the invention proposes a completely different method, i.e., a method in which the significant lateral radiation of the chip is directly emitted onto the windshield in a transverse fashion. Due to this measure, a significantly higher yield for the luminous flux to be measured is achieved while simultaneously significantly reducing the space requirement.

The position of the chips on the printed circuit board can be defined very accurately. Another advantage can be seen in the fact that the respective spatial dimensions for the transmitters and the receiver as well as the spatial dimensions of the printed circuit board can be reduced significantly. This is particularly important in that the sensor needs to be positioned within the region of the windshield which is cleaned by the windshield wipers, i.e., the sensor is situated within the field of vision of the driver. However, a smaller sensor may, for example, be positioned in the bracket of the rear-view mirror such that it is not visible to the driver.

In instances in which static or quasi-static illumination conditions should be suppressed in the resultant measurement, the invention proposes, to utilize several radiation transmitters such that slow changes in the measured luminous flux can be easily suppressed. In one case, a larger number of monitored regions on the windshield is achieved. The utilization of only one radiation receiver that may be realized in the form of a light-receiving diode ensures that the same reflected luminous flux always leads to the same resultant measurement.

In order to eliminate interferences due to light that lies within the visible range for humans, it is advantageous to utilize very long-wave or short-wave radiation. In this respect, the present invention proposes the utilization of infrared radiation. A cover is utilized to mechanically protect the LED chips. In one case, the cover simultaneously serves as an IR filter. A black cover results in an esthetically appealing appearance. In addition, radiation that lies outside of the frequency range emitted by the LED transmitters is prevented from reaching the receiver. The cover contains recesses that are allocated to the individual transmitters and receivers, with said recesses creating space for the LED chips and their wiring. Due to this approach, the recesses form an encapsulation for the individual chips on the printed circuit board.

In order to increase the measurement sensitivity, one attempts to prevent any radiation from reaching the receiver that does not result from the total reflection of the radiation emitted by the transmitters on the outer boundary layer of the windshield. In this case, an optical barrier surrounds the receiver in the form of an essentially annular wall that is impermeable to infrared radiation, and prevents the transmitted infrared radiation emitted onto the cover, as well as radiation emitted onto the cover via the windshield, from reaching the receiver as long as it is not incident on the receiver at the intended angle.

A particularly simple design of the barrier can be achieved in which the barrier extends around the reception diode in an essentially annular fashion at a suitable distance. The barrier forms an annular insert that consists of a material other than the material of the cover. The cover is intended to guide infrared radiation toward the windshield, with the insert preventing, in particular, the propagation of this infrared radiation. In addition, it is particularly advantageous if this insert consists of an elastic material such that it is able to better adapt to the printed circuit board and form a superior seal. Another option consists of mounting the barrier on the printed circuit board to prevent that radiation resulting from the total refraction on the boundary surface of the windshield from reaching the receiver via the adhesive layer described below. In this respect, it would also be conceivable to provide a barrier within the adhesive layer. This barrier may, for example, also be mounted on the cover and, if so required, be designed integrally with the barrier that points to the printed circuit board. The barrier does not necessarily have to consist of a closed circle. It may also have a shape other than circular, i.e., it may consist of several walls or have the shape of a section of a spiral.

In order to conduct away the heat emitted by the diodes and prevent interfering (electromagnetic) radiation from reaching the strip conductors of the printed circuit board, which lie in the plane of the chips, the invention proposes that the underside of the printed circuit board be provided with a large-surface copper layer that needs to be designed such that space for plug connectors, centering posts, and the like remains.

Another additional development of the invention pertains to the mounting of the sensor on the windshield. In this case, the cover is mounted on the inner surface of the windshield by means of an adhesive layer. Consequently, means that make it possible for the cover to hold the printed circuit board with the chips need to be provided. This may, for example, be realized in the form of a snap-in connection with lateral arms on the cover, inseparable adhesive connections, or separable screw connections. The adhesive layer needs to be sufficiently thick to compensate for the curvature of the windshield with respect to the plane surface of the cover. In certain instances, as well as in large series production, the surface of the cover may also be adapted to the curvature of the windshield. In this case, the adhesive layer may be significantly thinner. The adhesive layer may also serve to adjust the distance of the printed circuit board and the chips from the boundary surface of the windshield so as to compensate for the different thicknesses of windshields in various types of motor vehicles.

A thickness of approximately 1 mm proved practical for the adhesive layer. In order to maintain the propagation of the radiation emitted by the transmission chips as high as possible, one attempts to adapt the refractive index of the cover and the adhesive layer to the refractive index of the windshield.

BRIEF DESCRIPTION OF THE DRAWING

One embodiment of the invention is described below with reference to the Figures. In the Figures:

FIG. 1 is a symbolic representation of the radiation that can be measured by the receiver if a conventional luminous diode incorporated into a separate housing is utilized;

FIG. 2 is the increase in the radiation capacity by utilizing LED chips that are directly bonded onto a printed circuit board;

DESCRIPTION OF THE PREFERRED EMBODIMENT

Figure 3:
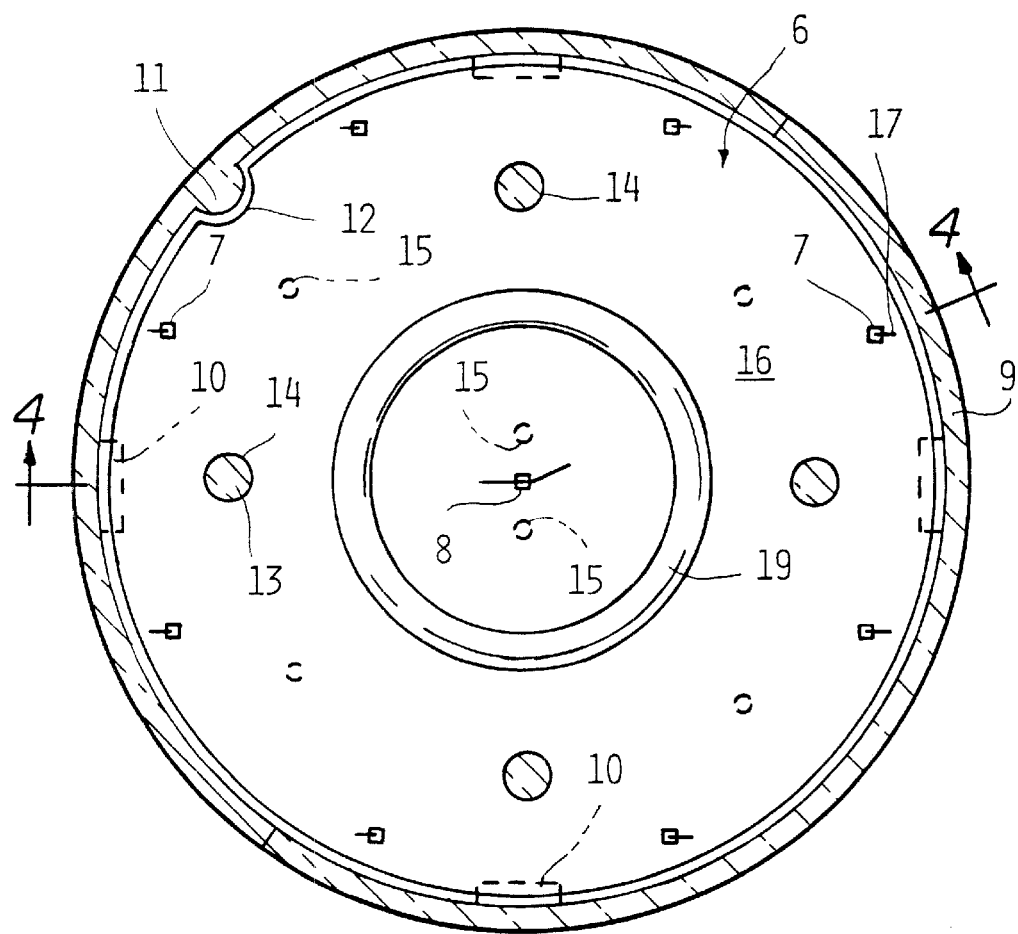
FIG. 3 is a cross-sectional top view taken along lines 3—3 in FIG. 4 of the printed circuit board with a cover sectioned at the elevation of a surface of the printed circuit board.

FIG. 1 shows a section through windshield 1, on which two conventional luminous transmitter diodes 3 and a commercially available receiver diode 4 are mounted by means of adhesive layer 2. Transmitter diodes 3 usually have an angle of radiation of 120 degrees. FIG. 1 shows that only a small fraction of the emitted radiation reaches receiver diode 4 by means of total reflection if one observes the plane of section of the radiation. This is caused by the fact that total refraction can only occur over a very small region of the emitted radiation. Explicit mathematical details regarding this aspect are described in DE-OS 43 37 835.

FIG. 2 clearly shows the increase in the radiation emitted by transmitter or LED transmitter chip 7 which reaches receiver or LED receiver chip 8 by means of total refraction. FIG. 2 also shows windshield 1, but cover 5 including printed circuit board 6 encompassed by cover 5 is mounted on windshield 1 by means of adhesive layer 2 in this case. Under otherwise comparable conditions, encapsulated transmitter diodes 3 of FIG. 1 are replaced with LED transmitter chips 7 that are bonded onto printed circuit board 6, with receiver diode 4 of FIG. 1, that is provided with a housing, being replaced with LED receiver chip 8. In this respect, components 7 and 8 have a comparable design. Since LED transmitter chip 7 does not contain a reflector, the chip has a radiation behavior such that 30% of the radiation is emitted via the end face of the chip 7, and 70% of the radiation is emitted via the lateral surfaces (edges). It is important for the invention that the surface region on the boundary layer of windshield 1, at which a total reflection to LED receiver chip 8 is possible, receives more power per surface area. In comparison to the comparable conditions of FIG. 1, one attains a higher reception power at LED receiver chip 8 despite the elimination of a reflector.

Figure 4:
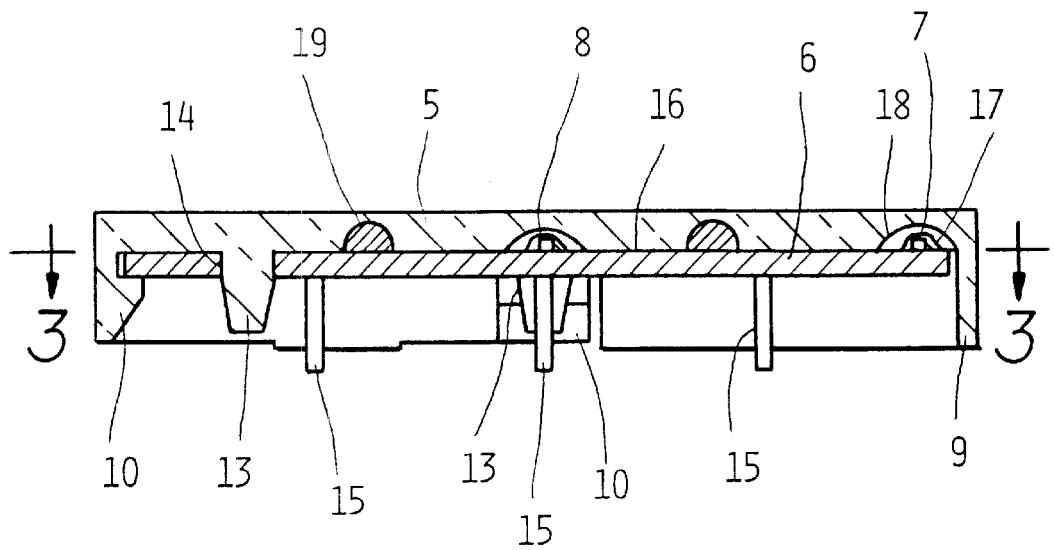
FIG. 4 is a cross-sectional side view taken along lines 4—4 in FIG. 3.

FIGS. 3 and 4 show the essentially circular printed circuit board 6 on which eight LED transmitter chips 7 as well as one LED receiver chip 8 are positioned. FIGS. 3 and 4 also show circumferential projection 9 of cover 5 with springable snap-in hooks 10 being provided on projection 9. Snap-in hooks 10 clamp printed circuit board 6 in position. Projection 9 is also provided with centering projection 11 that engages into corresponding recess 12 in printed circuit board 6 if cover 5 is properly positioned relative to printed circuit board 6. The position of cover 5 relative to printed circuit board 6 is additionally secured by centering pins 13 that protrude into assigned openings 14 in printed circuit board 6. Printed circuit board 6 also contains downwardly protruding plug-in pins 15, by means of which the unit consisting of cover 5 and printed circuit board 6 can, for example, be attached and electrically connected to a processing unit that has the shape of a circular disk. Surface 16 of printed circuit board 6 not only contains the electric connecting lines, but also LED transmitter chips 7 with their connecting wires 17. As seen in FIG. 4, cover 5 is provided with essentially dome-shaped recesses 18 in order to create space for LED transmitter chips 7 as well as LED receiver chip 8. Another important aspect of the sensor according to the invention is barrier 19 of an elastic plastic material that is impermeable to light and annularly inserted into cover 5. As described previously, barrier 19 may, however, also be designed differently.

What is claimed is:

1. A sensor for detecting a coating on an outer surface of a windshield, the sensor comprising:
   at least one transmitter arranged on a printed circuit board, wherein the transmitter emits radiation into the windshield via an inner surface of the windshield; and
   a receiver receiving at least part of the radiation reflected on an outer boundary surface of the windshield and emerging from the inner surface of the windshield; and wherein the transmitter is bonded onto the printed circuit board, and the transmitter consists of an LED chip operating as an edge emitter.

2. A sensor for detecting a coating on an outer surface of a windshield, the sensor comprising:
   at least one transmitter arranged on a printed circuit board, wherein the transmitter emits radiation into the windshield via an inner surface of the windshield; and
   a receiver receiving at least part of the radiation reflected on an outer boundary surface of the windshield and emerging from the inner surface of the windshield; and wherein the transmitter is bonded onto the printed circuit board, and the transmitter consists of a LED chip operating as an edge emitter, and several transmitters are circularly arranged around the receiver.

3. The sensor according to claim 1, characterized by the fact that the transmitter consists of an IRED chip.

4. The sensor according to claim 1, characterized in that a cover is inserted between the inner surface of the windshield and the printed circuit board that contains the at least one transmitter and the receiver, in that the cover is formed of a plastic material that is permeable to infrared radiation, and in that the side of the cover which faces the at least one transmitter and the receiver is provided with curved recesses that are respectively assigned to the at least one transmitter and the receiver.

5. The sensor according to claim 4, characterized in that the cover is provided with an optical barrier that allows the radiation of the transmitter to pass to the receiver, with said radiation being emitted by the transmitter at a defined angular range with respect to the windshield and reflected to the receiver by the boundary layer of the windshield.

6. The sensor according to claim 5, characterized in that the barrier includes an essentially annular insert that is connected to the cover, arranged between the transmitter and the receiver, and surrounds the radiation receiver in an essentially concentric fashion.

7. The sensor according to claim 5, characterized in that the insert is formed of an elastic material that is impermeable to luminous radiation.

8. The sensor according to claim 1, characterized in that a side of the printed circuit board which faces away from the transmitters is provided with a large-surface copper layer.

9. The sensor according to claim 1, characterized in that an adhesive layer that holds the sensor on the inner surface of the windshield is inserted between the inner surface of the windshield and the lateral surface of the cover which faces the inner surface of the windshield.

10. The sensor according to claim 9, characterized in that the thickness of the adhesive layer approximately corresponds to the thickness of the cover.

11. The sensor according to claim 9, characterized in that the cover and the adhesive layer essentially have the same refractive index as the windshield, with the refractive index of the windshield being approximately between 1.5 and 1.65.

12. The sensor according to claim 4, characterized in that a coating on the outer surface of the windshield consists of at least one of moisture and dirt.

13. The sensor according to claim 1, characterized in that the receiver is a receptor chip bonded onto the printed circuit board.

14. A sensor for detecting a coating on an outer surface of a windshield, the sensor comprising:

at least one transmitter arranged on a printed circuit board, wherein the transmitter emits radiation into the windshield through an inner surface of the windshield; and a receiver receiving at least part of the radiation reflected on an outer boundary surface of the windshield and emerging from the inner surface of the windshield; and wherein the receiver is an LED receiver chip bonded onto the printed circuit board, the printed circuit board having an essentially flat surface and arranged essentially parallel to the plane of the windshield.

15. The sensor according to claim 14, characterized in that a cover permeable to infrared radiation is inserted between the inner surface of the windshield and the printed circuit board.

16. The sensor according to claim 15, characterized in that the cover is provided with an optical barrier arranged in an essentially concentric fashion around the LED receiver chip, wherein the barrier is arranged between the at least one transmitter and the LED receiver chip.

17. The sensor according to claim 16, characterized in that the barrier is formed of an elastic material impermeable to luminous radiation.

18. The sensor according to claim 14, characterized in that a side of the printed circuit board facing away from the transmitters is provided with a large-surface copper layer.

19. The sensor according to claim 14, characterized in that the at least one transmitter comprises a plurality of transmitters circularly arranged around the LED receiver chip.

20. The sensor according to claim 15, characterized in that the cover extends from the inner surface of the windshield to a side of the printed circuit board facing away from the windshield, and a side of the cover that faces the at least one transmitter and the LED receiver chip is provided with curved recesses that are respectively assigned to the at least one transmitter and the LED receiver chip.

* * * * *